US012696367B2

(12) United States Patent
Lambesis et al.

(10) Patent No.: US 12,696,367 B2
(45) Date of Patent: Jul. 28, 2026

(54) METHODS AND SYSTEMS FOR SYNCHRONIZING LIGHTING TO MUSIC IN REAL-TIME

(71) Applicant: Pinnacle 20, LLC, Cave Creek, AZ (US)

(72) Inventors: Nikos Aristotle Lambesis, Cave Creek, AZ (US); James Alexander Kaye, Phoenix, AZ (US)

(73) Assignee: Pinnacle 20, LLC, Cave Creek, AZ (US)

( * ) Notice: Subject to any disclaimer, the term of this patent is extended or adjusted under 35 U.S.C. 154(b) by 0 days.

(21) Appl. No.: 19/309,487

(22) Filed: Aug. 25, 2025

(65) Prior Publication Data

US 2026/0059630 A1 Feb. 26, 2026

Related U.S. Application Data

(60) Provisional application No. 63/686,679, filed on Aug. 23, 2024.

(51) Int. Cl.
*H05B 47/12* (2020.01)
*G10H 1/00* (2006.01)
*H05B 47/155* (2020.01)

(52) U.S. Cl.
CPC ........... *H05B 47/12* (2020.01); *G10H 1/0008* (2013.01); *H05B 47/155* (2020.01); *G10H 2210/076* (2013.01)

(58) Field of Classification Search
CPC . G01N 2021/8838; F21S 10/02; G10H 1/368; G10H 2240/205; G10H 2240/325; G10H 1/0016; G10H 1/0083; G10H 1/0553; G10H 2220/021; G10H 2220/305
USPC .......................................... 73/587, 653, 655
See application file for complete search history.

(56) References Cited

U.S. PATENT DOCUMENTS

2021/0160975 A1* 5/2021 Cremer ................... F21S 10/02
2021/0195716 A1* 6/2021 Rasmussen ............. G06F 3/165

FOREIGN PATENT DOCUMENTS

JP 2022523150 A * 4/2022 ............... H04R 5/04

* cited by examiner

*Primary Examiner* — Truong D Phan
(74) *Attorney, Agent, or Firm* — Pacer K. Udall; Booth Udall, PLC

(57) ABSTRACT

A method for synchronizing lighting to music in real-time includes detecting beats in an audio stream of music, estimating a tempo of the music in the audio stream based on the detected beats, and triggering one or more lighting actions in response to the detected beats based on the estimated tempo. Beats may be detected by looping through a process for each of a plurality of audio samples. The process includes determining a loudness of the audio sample, comparing the loudness of the audio sample with an average loudness of a previous predetermined number of audio samples, and detecting a beat when the loudness of the audio sample is at least 1.05 standard deviation above the average loudness of the previous predetermined number of audio samples.

16 Claims, 15 Drawing Sheets

152

| | | | | | | | | | | | | |
|---|---|---|---|---|---|---|---|---|---|---|---|---|
| 154 | ARRAY INDEX | 45 | 46 | 47 | 48 | 49 | 50 | 51 | 52 | 53 | 54 | 55 |
| 162 | FIRST BEAT | +0 | +0 | +0 | +0 | +500 | +1000 | +500 | +0 | +0 | +0 | +0 |
| 164 | SECOND BEAT | +0 | +0 | +0 | +500 | +1000 | +500 | +0 | +0 | +0 | +0 | +0 |
| 166 | THIRD BEAT | +0 | +0 | +0 | +0 | +0 | +500 | +1000 | +500 | +0 | +0 | +0 |
| 168 | TOTAL SCORE | 0 | 0 | 0 | 500 | 1500 | 2000 | 1500 | 500 | 0 | 0 | 0 |

FIG. 16

170

| | | | | | | | | | | | | | | | |
|---|---|---|---|---|---|---|---|---|---|---|---|---|---|---|---|
| 172 | TEMPO CANDIDATE (BPM) | 40 | 41 | 42 | 43 | 44 | 45 | 46 | 47 | 48 | 49 | 50 | ... | 178 | 179 | 180 |
| 174 | ARRAY INDEX OF QUARTER-NOTE SCORE | 30 | 31 | 32 | 33 | 34 | 35 | 36 | 37 | 38 | 39 | 40 | ... | 168 | 169 | 170 |
| 176 | ARRAY INDEX OF EIGHTH-NOTE SCORE | 70 | 72 | 74 | 76 | 78 | 80 | 82 | 84 | 86 | 88 | 90 | ... | 346 | 348 | 350 |
| 178 | ARRAY INDEX OF SIXTEENTH-NOTE SCORE | 150 | 154 | 158 | 162 | 166 | 170 | 174 | 178 | 182 | 186 | 190 | ... | 702 | 706 | 710 |
| 180 | ARRAY INDEX OF HALF-NOTE SCORE | 10 | 11 | 11 | 12 | 12 | 13 | 13 | 14 | 14 | 15 | 15 | ... | 79 | 80 | 80 |
| 182 | ARRAY INDEX OF WHOLE-NOTE SCORE | 0 | 1 | 1 | 1 | 1 | 2 | 2 | 2 | 2 | 3 | 3 | ... | 35 | 35 | 35 |
| 184 | ARRAY INDEX OF 8TH NOTE TRIPLET SCORE | 110 | 113 | 116 | 119 | 122 | 125 | 128 | 131 | 134 | 137 | 140 | ... | 524 | 527 | 530 |

FIG. 17

500

00> PERIOD 1163 MAPPED TO TARGET BIN 41; BIN SCORE INCREMENTED TO 93786
00> TEMPO CANDIDATES BEFORE BINNING:

| | | | | | | | | | | | | | | | | |
|---|---|---|---|---|---|---|---|---|---|---|---|---|---|---|---|---|
| 510 | 00> BPM: | 40 | 41 | 50 | 51 | 52 | 53 | 57 | 58 | 59 | 60 | 62 | 66 | 67 | 68 | 69 |
| 520 | 00> SCORE / 100: | 280 | 136 | 400 | 3751 | 3487 | 1200 | 73 | 1041 | 1110 | 400 | 0 | 0 | 0 | 566 | 565 |

00>

| | | | | | | | | | | | | | | | | | | | | |
|---|---|---|---|---|---|---|---|---|---|---|---|---|---|---|---|---|---|---|---|---|
| 510 | 00> BPM: | 72 | 73 | 74 | 75 | 76 | 77 | 78 | 79 | 80 | 81 | 82 | 92 | 100 | 101 | 102 | 104 | 105 | 106 | 107 |
| 520 | 00> SCORE / 100: | 26 | 25 | 385 | 1452 | 1528 | 4662 | 4866 | 1984 | 186 | 165 | 100 | 665 | 300 | 2813 | 2813 | 2635 | 2615 | 900 | 900 |

| | | | | | | | | | | | | | | | | | | | | | | |
|---|---|---|---|---|---|---|---|---|---|---|---|---|---|---|---|---|---|---|---|---|---|---|
| 510 | 00> BPM: | 114 | 115 | 116 | 117 | 118 | 119 | 120 | 121 | 124 | 125 | 132 | 133 | 134 | 135 | 136 | 137 | 138 | 144 | 145 | 146 | 147 |
| 520 | 00> SCORE / 100: | 57 | 56 | 781 | 780 | 833 | 833 | 300 | 300 | 0 | 0 | 0 | 0 | 0 | 0 | 377 | 754 | 376 | 17 | 35 | 17 | 860 |

| | | | | | | | | | | | | | | | | | | | |
|---|---|---|---|---|---|---|---|---|---|---|---|---|---|---|---|---|---|---|---|
| 510 | 00> BPM: | 148 | 149 | 150 | 151 | 152 | 153 | 154 | 155 | 156 | 157 | 158 | 159 | 160 | 161 | 162 | 163 | 164 | 165 |
| 520 | 00> SCORE / 100: | 289 | 289 | 1162 | 576 | 1146 | 1526 | 3402 | 3391 | 3598 | 3394 | 1488 | 1488 | 140 | 140 | 120 | 147 | 71 | 44 |

FIG. 18

500

```
    00> TEMPO CANDIDATES AFTER BINNING:
510 00> BPM:             40|   51|   59|  62|   68|    78|  92|   102|  118| 124|  137|   156|
520 00> SCORE / 100:    416| 8838| 2625|   0| 1131| 15385| 665| 13277| 3942|   0| 1509| 23350|
    00>
    00> BPM ESTIMATE IS 156 WITH SCORE 2335017
```

FIG. 19

600

| | LIGHTING PARAMETER (610) | SPEED LEVEL (620) | | | | |
|---|---|---|---|---|---|---|
| | | 5 | 4 | 3 | 2 | 1 |
| 611 | "SMOOTH COLOR CHANGE" DURATION | 1/64 | 1/32 | 1/16 | 1/16 | 1/8 |
| 612 | BEAT DETECTOR LOCKOUT PERIOD | 1/64 | 1/32 | 1/16 | 1/16 | 1/4 |
| 613 | "DIMMER INCREASE" DURATION | 3/128 | 1/32 | 3/64 | 1/16 | 3/32 |
| 614 | "DIMMER DECREASE" DURATION | 1/4 | 1/4 | 1/4 | 1/4 | 1/4 |
| 615 | PATTERN ADVANCES PER BEAT TRIGGER | 4 | 6 | 4 | 4 | 6 |
| 616 | DURATION OF EACH PATTERN ADVANCE | 1/128 | 3/256 | 1/64 | 1/32 | 3/64 |

FIG. 20

| LIGHTING PARAMETER | SPEED LEVEL | | | | |
|---|---|---|---|---|---|
| | 5 | 4 | 3 | 2 | 1 |
| 'SMOOTH COLOR CHANGE' DURATION | 0 | 0 | 0 | 0 | 0 |
| BEAT DETECTOR LOCKOUT PERIOD | 1/16 | 1/8 | 1/4 | 1/2 | 1 |
| 'DIMMER INCREASE' DURATION | 1/64 | 1/32 | 1/16 | 3/32 | 1/8 |
| 'DIMMER DECREASE' DURATION | 1/8 | 1/4 | 1/2 | 1 | 3/2 |
| PATTERN ADVANCES PER BEAT TRIGGER | 4 | 4 | 4 | 4 | 4 |
| DURATION OF EACH PATTERN ADVANCE | 1/128 | 1/64 | 1/32 | 1/16 | 1/8 |

FIG. 21

METHODS AND SYSTEMS FOR SYNCHRONIZING LIGHTING TO MUSIC IN REAL-TIME

RELATED APPLICATIONS

This application claims the benefit of U.S. Provisional Application No. 63/686,679, filed Aug. 23, 2024 and titled "Methods and Systems for Synchronizing Lighting to Music in Real-Time," the entirety of the disclosure of which is hereby incorporated by this reference.

TECHNICAL FIELD

This document relates generally to synchronizing lighting to music, and more specifically to methods and systems for synchronizing lighting (such as LED lighting) to music in real-time.

BACKGROUND

Lighting is sometimes synchronized to music in various settings, such as at concerts, casinos, video arcades, and fairs/carnivals/amusement parks. As another example, some people decorate their homes or other buildings or venues with holiday lights that are synchronized with music. These existing solutions may add energy and ambience to a variety of spaces, but they depend upon a trained user manually pre-programming the lighting sequence to align with a pre-selected piece of music. Thus, in these instances the light show is "pre-recorded."

Some more modern solutions have succeeded in using software automation to add lighting cues to music, but these solutions must be fed a file of prerecorded audio, and in turn will output a new file format with the cues added. Essentially, the lighting events are still pre-programmed by the time the music is played back to an audience. The need for the lighting sequence to be pre-recorded or pre-programmed limits the application of lighting synchronized to music.

SUMMARY

According to some embodiments, the present disclosure relates to a method for synchronizing lighting to music in real-time. In some embodiments, the method includes detecting beats in an audio stream of music, estimating a tempo of the music in the audio stream based on the detected beats, and triggering one or more lighting actions in response to the detected beats based on the estimated tempo.

In some embodiments, detecting the beats in the audio stream of music includes, for each of a plurality of audio samples within the audio stream: determining a loudness of the audio sample, comparing the loudness of the audio sample with an average loudness of a previous predetermined number of audio samples within the audio stream, and detecting a beat when the loudness of the audio sample is at least 1.05 standard deviation above the average loudness of the previous predetermined number of audio samples. In some embodiments, estimating the tempo of the music includes updating an array of beat scores each time a new beat is detected. In some embodiments, the updating includes measuring how much time has elapsed between a previous beat and the newly detected beat, identifying a target array index associated with the elapsed time, and increasing a score of the target array index by a fixed amount. In some embodiments, estimating the tempo of the music includes combining scores from the array of beat scores that correspond to each note length associated with each of a plurality of tempo candidates and selecting a tempo candidate that has the highest combined score as the estimated tempo.

In some embodiments, the method for synchronizing music in real-time also includes transitioning between activity periods during which lighting actions are triggered for the detected beats and lockout periods during which no lighting actions are triggered. In some embodiments, a length of the activity periods and lockout periods are defined based on the estimated tempo. In some embodiments, the one or more lighting actions include an action selected from the group consisting of: changing a brightness of a light, changing a color of a light, turning a light on, and turning a light off. In some embodiments, there is no more than 50 ms of latency between a detected beat and the one or more lighting actions triggered by the detected beat.

According to some embodiments, the present disclosure relates to a method for synchronizing lighting to music in real-time. In some embodiments, the method includes detecting beats in an audio stream by, for each of a plurality of audio samples: determining a loudness of the audio sample, comparing the loudness of the audio sample with an average loudness of a previous predetermined number of audio samples, and detecting a beat when the loudness of the audio sample is at least 1.05 standard deviation above the average loudness of the previous predetermined number of audio samples. In some embodiments, the method includes triggering a lighting action in response to the detected beats.

In some embodiments, the method also includes transitioning between activity periods during which lighting actions are triggered for the detected beats and lockout periods during which no lighting actions are triggered. In some embodiments, a length of the activity periods and lockout periods are defined based on a tempo of music in the audio stream. In some embodiments, the method also includes estimating the tempo of the music in the audio stream by updating an array of beat scores each time a new beat is detected. In some embodiments, the updating is done by measuring how much time has elapsed between a previous beat and the newly detected beat, identifying a target array index associated with the elapsed time, and increasing a score of the target array index by a fixed amount. In some embodiments, the method also includes combining scores from the array of beat scores that correspond to each note length associated with each of a plurality of tempo candidates and selecting a tempo candidate that has the highest combined score as the estimated tempo.

In some embodiments, the scores from the array of beat scores exponentially decay toward zero over time. In some embodiments, the combined scores for adjacent tempo candidates are binned into one of the adjacent tempo candidates.

According to some embodiments, the present disclosure relates to a system for synchronizing lighting to music in real-time. In some embodiments, the system includes a plurality of lights and a controller configured to control operation of each of the plurality of lights. In some embodiments, the controller is configured to cause each of the plurality of lights to individually perform a lighting action. In some embodiments, the system includes a beat detection engine configured to detect beats in music being played and a tempo estimation engine configured to estimate a tempo of the music being played. In some embodiments, the controller is configured to receive input from the beat detection engine and the tempo estimation engine and trigger one or more lighting actions in the plurality of lights in response to detected beats based on the estimated tempo.

In some embodiments, the lighting action includes an action selected from the group consisting of: changing a brightness of a light, changing a color of a light, turning a light on, and turning a light off. In some embodiments, the controller is configured to trigger the one or more lighting actions during activity periods and is configured to not trigger the one or more lighting actions during lockout periods. In some embodiments, the controller is configured to transition between activity periods and lockout periods. In some embodiments, a length of the activity periods and lockout periods are defined based on the estimated tempo.

In some embodiments, the beat detection engine is configured to, for each of a plurality of audio samples within the music being played: determine a loudness of the audio sample, compare the loudness of the audio sample with an average loudness of a previous predetermined number of audio samples within the music being played, and detect a beat when the loudness of the audio sample is at least 1.05 standard deviation above the average loudness of the previous predetermined number of audio samples. In some embodiments, the tempo estimate engine is configured to update an array of beat scores each time a new beat is detected by measuring how much time has elapsed between a previous beat and the newly detected beat, identifying a target array index associated with the elapsed time, and increasing a score of the target array index by a fixed amount. In some embodiments, the tempo estimation engine is configured to combine scores from the array of beat scores that correspond to each note length associated with each of a plurality of tempo candidates and select a tempo candidate that has the highest combined score as the estimated tempo.

The foregoing and other aspects, features, and advantages will be apparent from the DESCRIPTION and DRAWINGS, and from the CLAIMS.

BRIEF DESCRIPTION OF THE DRAWINGS

Implementations will hereinafter be described in conjunction with the appended and/or included DRAWINGS.

FIG. 16 shows an array index with scores of multiple beats according to some embodiments.

FIG. 17 shows a lookup table for array indices associated with tempo candidates according to some embodiments.

FIG. 18 shows example tempo candidate scores before binning according to some embodiments.

FIG. 19 shows example tempo candidate scores after binning according to some embodiments.

FIGS. 20-21 show charts illustrating lighting parameters and speed levels according to some embodiments.

DETAILED DESCRIPTION

Figure 1A:
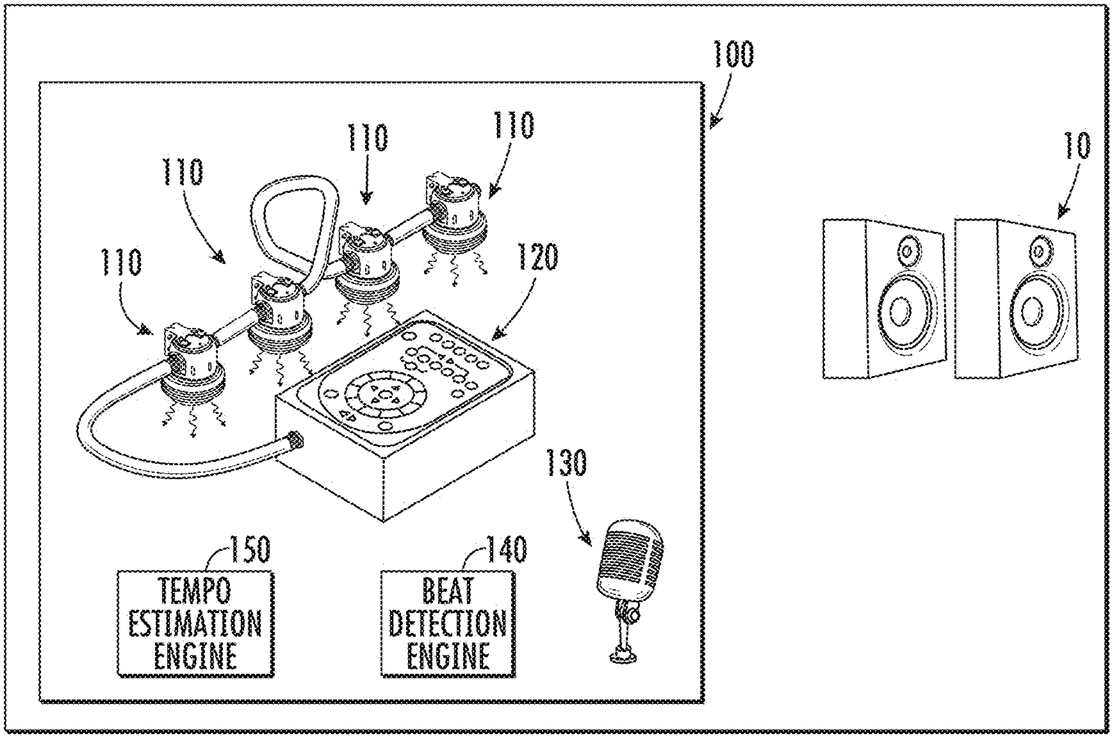
FIG. 1A is a schematic illustration of a system for synchronizing lighting to music in real-time according to some embodiments.

Detailed aspects and applications of the disclosure are described below in the following drawings and detailed description of the technology. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the disclosure. It will be understood, however, by those skilled in the relevant arts, that embodiments of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms “a,” “an,” and “the” include plural referents unless the context clearly dictates otherwise. Thus, for example, reference to “a step” includes reference to one or more of such steps. The term “plurality,” as used herein, means more than one.

The word “exemplary,” “example,” or various forms thereof are used herein to mean serving as an example, instance, or illustration. Any aspect or design described herein as “exemplary” or as an “example” is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented but have been omitted for purposes of brevity.

When a range of values is expressed, another embodiment includes from the one particular value and/or to the other particular value. Similarly, when values are expressed as approximations, by use of the antecedent “about,” it will be understood that the particular value forms another embodiment. All ranges are inclusive and combinable.

Throughout the description and claims of this specification, the words “comprise” and “contain” and variations of the words, for example “comprising” and “comprises,” mean “including but not limited to,” and are not intended to (and do not) exclude other components.

As required, detailed embodiments of the present disclosure are included herein. It is to be understood that the disclosed embodiments are merely exemplary of the invention that may be embodied in various forms. Therefore, specific structural and functional details disclosed herein are not to be interpreted as limits, but merely as a basis for teaching one skilled in the art to employ the present invention. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, devices, methods, applications, conditions, or parameters described and/or shown herein, and that the terminology used herein is for the purpose of describing particular embodiments by way of example only and is not intended to be limiting of the claimed inventions.

More specifically, this disclosure, its aspects and embodiments, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The present disclosure relates generally to synchronizing lighting to music, and more specifically to methods and systems for synchronizing lighting (such as LED lighting) to music in real-time. Lighting is sometimes synchronized to music in various settings, such as at concerts, casinos, video arcades, and fairs/carnivals/amusement parks. As another example, some people decorate their homes or other buildings or venues with holiday lights that are synchronized with music. These existing solutions may add energy and ambience to a variety of spaces, but they depend upon a trained user manually pre-programming the lighting sequence to align with a pre-selected piece of music. Thus, in these instances the light show is “pre-recorded.”

Some more modern solutions have succeeded in using software automation to add lighting cues to music, but these solutions must be fed a file of prerecorded audio, and in turn will output a new file format with the cues added. Essentially, the lighting events are still pre-programmed by the time the music is played back to an audience. The need for the lighting sequence to be pre-recorded or pre-programmed thus limits the application of lighting synchronized to music.

In some embodiments, the present disclosure provides a lighting solution that can follow music in real-time without pre-programming the sequence, allowing for musical lighting in a wider array of use cases and to a wider variety of users. In some embodiments, the lighting system reacts to music in real-time as the music is playing. For example, in some embodiments, there is no more than 50 ms of latency between a trigger event in the music and a corresponding action in the lighting. At the same time, the lighting system may be configured such that lighting actions do not occur too frequently. This feature helps follow the recommendation from the Epilepsy Foundation that photosensitive individuals should not be exposed to flashes greater than three per second, in order to be safe. Even to those without medical conditions, strobing lights can quickly cause fatigue.

In some embodiments, the lighting actions occur in time with the rhythm of the music. For example, the system is configured such that the lights and the music do not clash with each other. In some embodiments, a user of the lighting systems has some ability to control how frequently lighting actions are generated. The features laid out above are available, even as the audio volume and rhythmic content of the music changes from song to song. Thus, the real-time synchronization is able to account for the wide variety of volume, rhythm, beat, etc. in music (either between different songs or even within a single song).

In some embodiments, the lighting system and method uses statistics to achieve real-time moving-threshold beat-detection on audio sources. In some embodiments, the lighting system and method maps beat durations to scoring bins, and then sums those scoring bins to form tempo candidates. In some embodiments, the lighting system and method detects musical beats, derives the tempo of a musical source, and then synchronizes the lighting behavior to the derived tempo. This is all done in real-time. In some embodiments, the lighting system and method defines the lighting behavior in terms of musical note length.

An example lighting system 100 according to some embodiments is shown in FIG. 1A. In some embodiments, the lighting system 100 comprises lights 110, which may be LED lights 110. In some embodiments, the lighting system 100 may be configured like or have any of the features of the lighting systems described in U.S. application Ser. No. 17/728,851 filed Apr. 25, 2022, U.S. application Ser. No. 17/867,626 filed Jul. 18, 2022, and U.S. application Ser. No. 17/960,721 filed Oct. 5, 2022, the disclosures of each of which are hereby incorporated by reference in their entireties. The lights 110 may be configured to flash on and off, change colors, change brightness, or perform other actions. These actions are synchronized with music to add to the ambience of a venue. These actions may be done for all the lights 110 at one time, or they may be done individually to create various patterns. In some embodiments, the lighting system 100 comprises a lighting controller 120 to control the actions of each light 110 in a series of lights 110. In some embodiments, the lighting system 100 comprises a microphone 130 to receive audio from music that is playing, for example, from speakers 10 at a venue (or some other audio output 10). In some embodiments, the microphone 130 includes a pre-amplifier.

In some embodiments, the lighting system 100 comprises a beat detection engine 140. The beat detection engine 140 is configured to detect when a beat occurs in the music that is being played. The operation of the beat detection engine 140 is discussed below. In some embodiments, the lighting system 100 comprises a tempo estimation engine 150. The tempo estimation engine 150 is configured to estimate a tempo of the music that is being played based on the beats detected by the beat detection engine 140. The operation of the tempo estimation engine 150 is discussed below. In some embodiments, the microphone 130, the beat detection engine 140, and/or the tempo estimation engine 150 may be part of the light controller 120 (e.g., disposed within a single housing), or they may be part of a separate device.

Figure 1B:
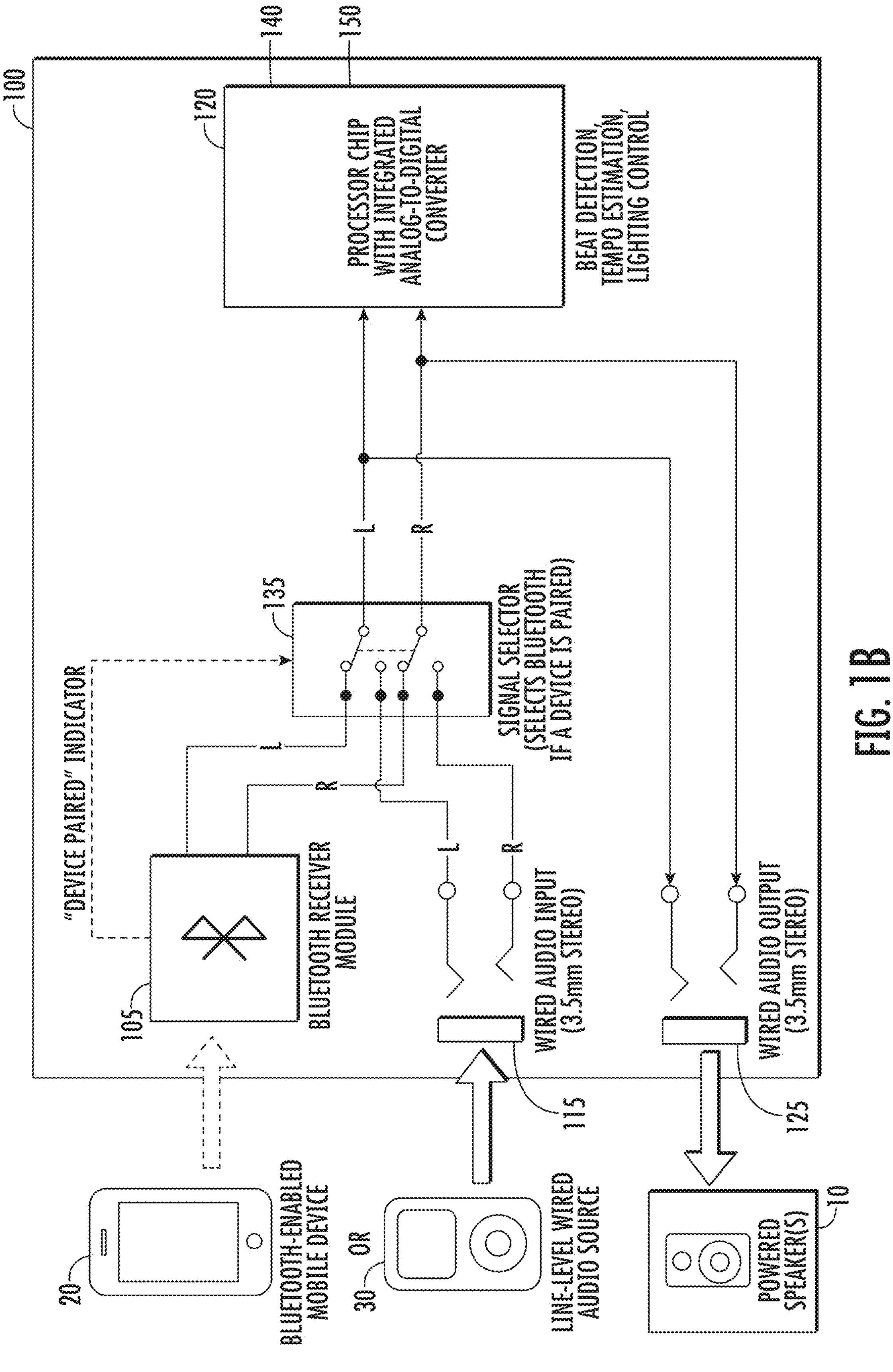
FIG. 1B is a schematic illustration of a system for synchronizing lighting to music in real-time according to some embodiments.

In some embodiments, the lighting system 100 directly receives the audio file digitally as it is playing, rather than having a microphone 130 detect the audio. For example, the audio file may be directed to the speaker 10 and a beat detection engine 140 simultaneously, as shown in FIG. 1B. For example, lighting system 100 may include one or more sources of audio input, such as a Bluetooth receiver module 105 and/or a wired audio input 115 (e.g., an audio jack). A Bluetooth-enabled device 20 (such as a smart phone, tablet, mobile device, computer, etc.) may pair with lighting system 100 through Bluetooth receiver module 105. Alternatively, an audio source 130 (which may be a smart phone, tablet, mobile device, computer, or any other audio source) may be connected to lighting system 100 through a wired connection at wired audio input 115.

Where lighting system 100 includes both Bluetooth receiver module 105 and wired audio input 115, lighting system 100 may include a signal selector 135 to transition between the two audio sources. In some embodiments, Bluetooth receiver module 105 may provide an indication to signal selector 135 that a device 20 is paired. In response to such an indication, the signal selector 135 will select the Bluetooth receiver module 105 as the audio signal source to relay to the beat detection engine 140 and the speaker 10. Without such an indication, the signal selector 135 will select the wired audio input 115 as the audio signal source to relay to the beat detection engine 140 and the speaker 10. In some embodiments, signal selector 135 (regardless of which source is providing the audio signal) will send the signal to a wired audio output 125, which may be wired to one or more speakers 10 to play the music, and to a circuit board (which may include the lighting controller 120, the beat detection engine 140, and the tempo estimation engine 150) to synchronize lighting with the music.

As noted above, the beat detection engine 140 and/or the tempo estimation engine 150 may be part of the light controller 120. (e.g., disposed within a single housing). FIG. 1B provides an example of this by providing the lighting controller 120, the beat detection engine 140, and the tempo estimation engine 150 on a single circuit board, such as a processor chip with an integrated analog-to-digital converter. In some embodiments, the beat detection engine 140 and/or the tempo estimation engine 150 may be part of a separate device than the light controller 120, even in situations where the lighting system 100 directly receives the audio file digitally as it is playing, rather than having a microphone 130 detect the audio.

The methods and systems for synchronizing lighting (such as LED lighting 110) to music in real-time may be based on beat-reactive lighting. Most popular music is performed at a tempo range between 50 and 150 beats per minute (BPM). Flashing an LED on each beat of a 50 BPM song results in the LED flashing at 0.83 Hz, and flashing an LED on each beat of a 150 BPM song results in the LED flashing at 2.5 Hz. Thus, both of these values on the ends of the range for most popular music fall within the Epilepsy Foundation guideline noted above of less than three flashes per second. In addition, because pre-programmed lighting systems are programmed to synchronize with the underlying rhythm of the music, an automated beat-synchronized solution would conform to user expectations about how music-synchronized lighting "should" look.

Figure 2:
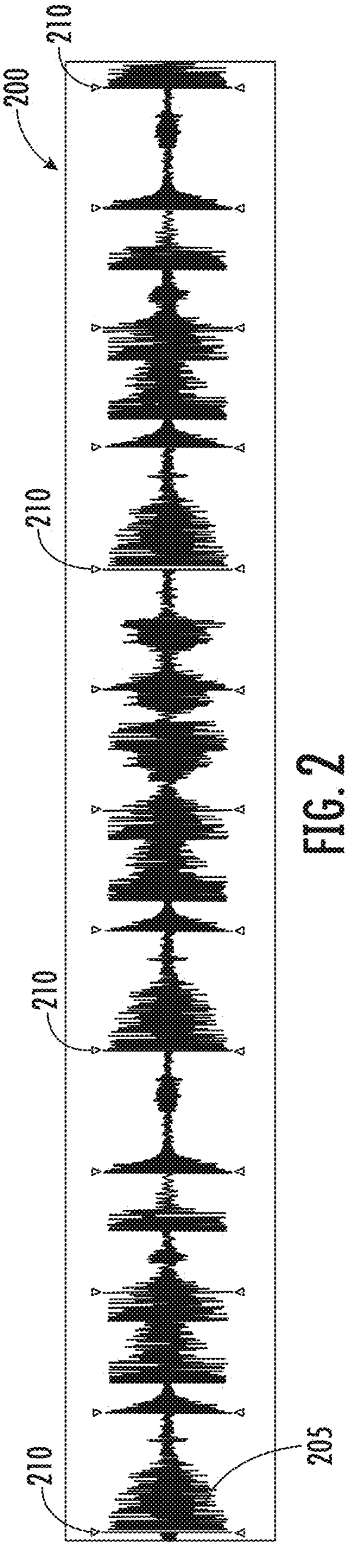
FIG. 2 is a representation of amplitude of a musical audio signal according to some embodiments.

In some embodiments, an initial step of the method is to find the beats in an audio stream. When the amplitude of a musical audio signal is plotted graphically, the repetitive rhythmic nature is often visible to the naked eye, as the loudness tends to hit a peak at evenly spaced intervals. An example of this is shown in FIG. 2. The graphical plot 200 illustrates the amplitude of the music audio signal 205. The peak loudness 210 is shown at spaced intervals.

The method may rely on this principle to find the beat by searching for peaks 210 in musical loudness. In some embodiments, the musical loudness may be determined by calculating the root-mean-square (RMS) of an audio clip. This produces a numerical result proportional to the clip's perceived loudness. The RMS is calculated using a set of n values ($x_1, x_2, \ldots, x_n$) (e.g., the values over a certain period of time), in which the RMS is $$x_{RMS} = \sqrt{\frac{1}{n}\left(x_1^2 + x_2^2 + \ldots + x_n^2\right)}.$$

Figure 3:
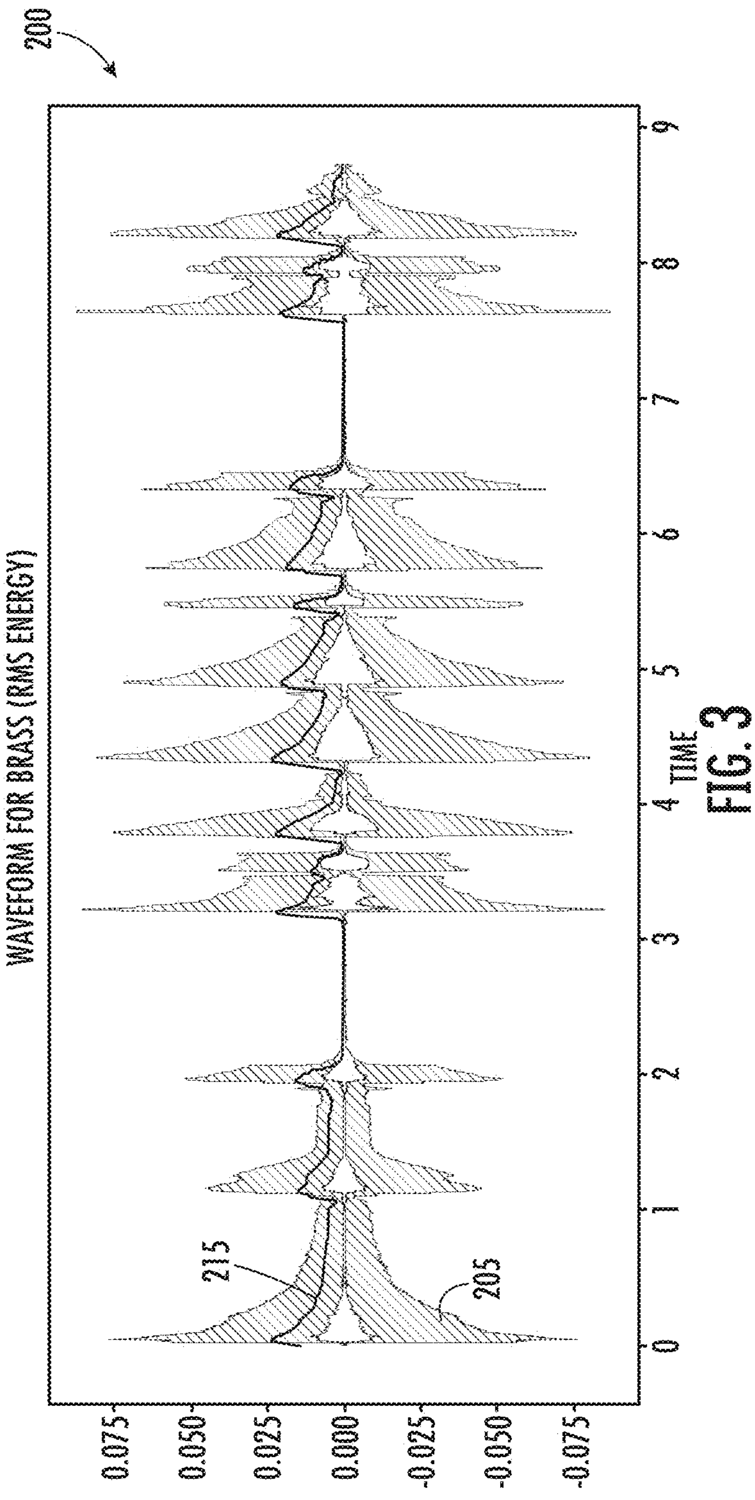
FIG. 3 is a representation of an audio clip and the root-mean-square of the audio clip according to some embodiments.

FIG. 3, for example, shows the RMS 215 of the audio waveform (e.g. audio signal 205).

Figure 4:
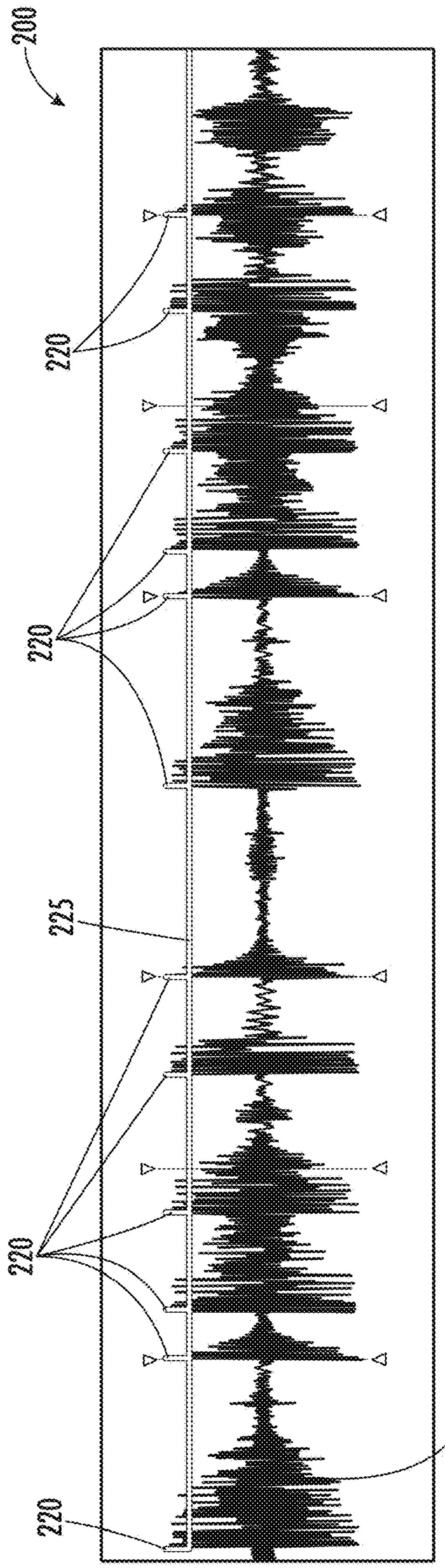
FIG. 4 is a representation of an absolute threshold for determining a beat in an audio clip according to some embodiments.

In some embodiments, a beat may be determined any time the audio's RMS volume exceeds an absolute threshold. An example of this approach is shown in FIG. 4. An absolute threshold 225 is illustrated on the graphical plot 200. Any time the volume of the audio signal 205 exceeds absolute threshold 225, a beat 220 is detected.

Figure 5:
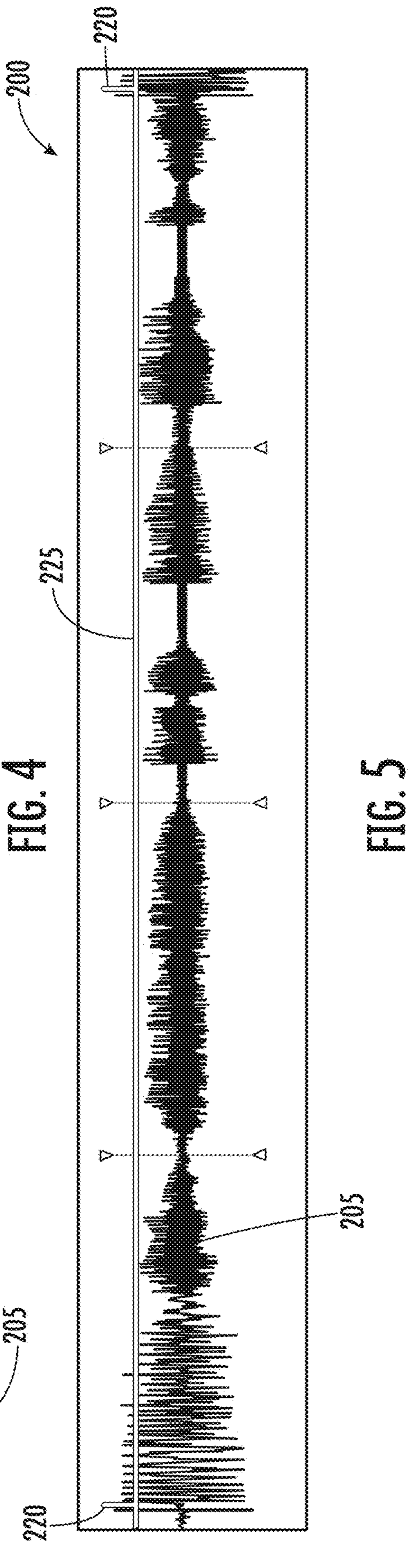
FIG. 5 is a representation of an absolute threshold for determining a beat in an audio clip according to some embodiments.

While this is the simplest approach, problems may occur in an absolute-threshold-based beat detection approach because music volume is inconsistent. For example, a quiet song may require a lower beat threshold 225 than a loud song. In addition, music volume within a song itself may vary. For example, in FIG. 5, beats 220 are detected at the beginning and end of the portrayed audio clip in graphical plot 200 because the volume exceeds absolute threshold 225. However, beats in the middle of the audio clip are missed because the threshold 225 is too high. Absolute-threshold-based beat detection may not provide the lighting system 100 with the ability to adapt to successive songs of varying volume and rhythm.

Thus, in some embodiments, the lighting system 100 and method implements a moveable beat detection threshold. For example, the lighting system 100 may maintain a history of previous loudness measurements. The latest measurement may be compared against the historical average loudness, rather than comparing against a fixed threshold. In some embodiments, the historical average loudness is the arithmetic mean of all the loudness measurements stored in the history of the audio clip. Equipped with the historical average loudness, the amount by which a new measurement must exceed this average loudness to classify as a beat is determined.

Two distinct recordings of music may have identical average loudness over time despite having vast differences in how widely that loudness swings from one moment to the next. For example, a recording of a sustained note played on a flute may feature the same average loudness as that of a drum being repeatedly hit. However, the flute recording will show little variation in loudness from one moment to the next, while the drum recording will show wide variations in loudness depending upon how recently the drum was struck. To account for this complication, the standard deviation of the set of historical loudness measurements is computed. Defining the beat detection criteria in terms of the standard deviation allows for tunable sensitivity.

If the beat detection criteria are defined as an instance when the measured loudness exceeds the historical average by at least $1\sigma$ (1 standard deviation), and if the loudness over time follows a normal statistical distribution, it can be expected that 15.8% of all measurements will classify as beats. If the criteria are modified such that the measurement must exceed the historical average by at least 20, then by mathematical definition only 2.2% of measurements are expected to classify as beats. In some embodiments, the detection criteria may be tuned experimentally to minimize detection error across the wide array of songs and musical genres. For example, the system 100 may be configured to compare the detected beats of a song to beats that should have been detected. Over time, the system 100 can improve its beat detection by accounting for previous errors that were made.

In some embodiments, the system 100 comprises a beat detection engine 140 to identify beats in an audio clip of music. In some embodiments, the beat detection engine 140 executes the following process, which may loop continuously. A sample buffer fills with 25.6 milliseconds worth of audio samples. In some embodiments, the RMS 215 of the sample buffer is computed. This RMS 215 result serves as an approximation for how loud this 25.6 ms piece of audio sounds. A running history of the previous 24 RMS loudness measurements (representing the past 614 ms of music just played) serves as the baseline for comparison. If the latest RMS measurement is at least 1.05 standard deviations above the mean RMS value stored in the running history, then a beat detection is triggered. This latest RMS measurement is added to the running history, replacing the oldest measurement. The process then repeats with a new buffer of audio samples.

Figure 6:
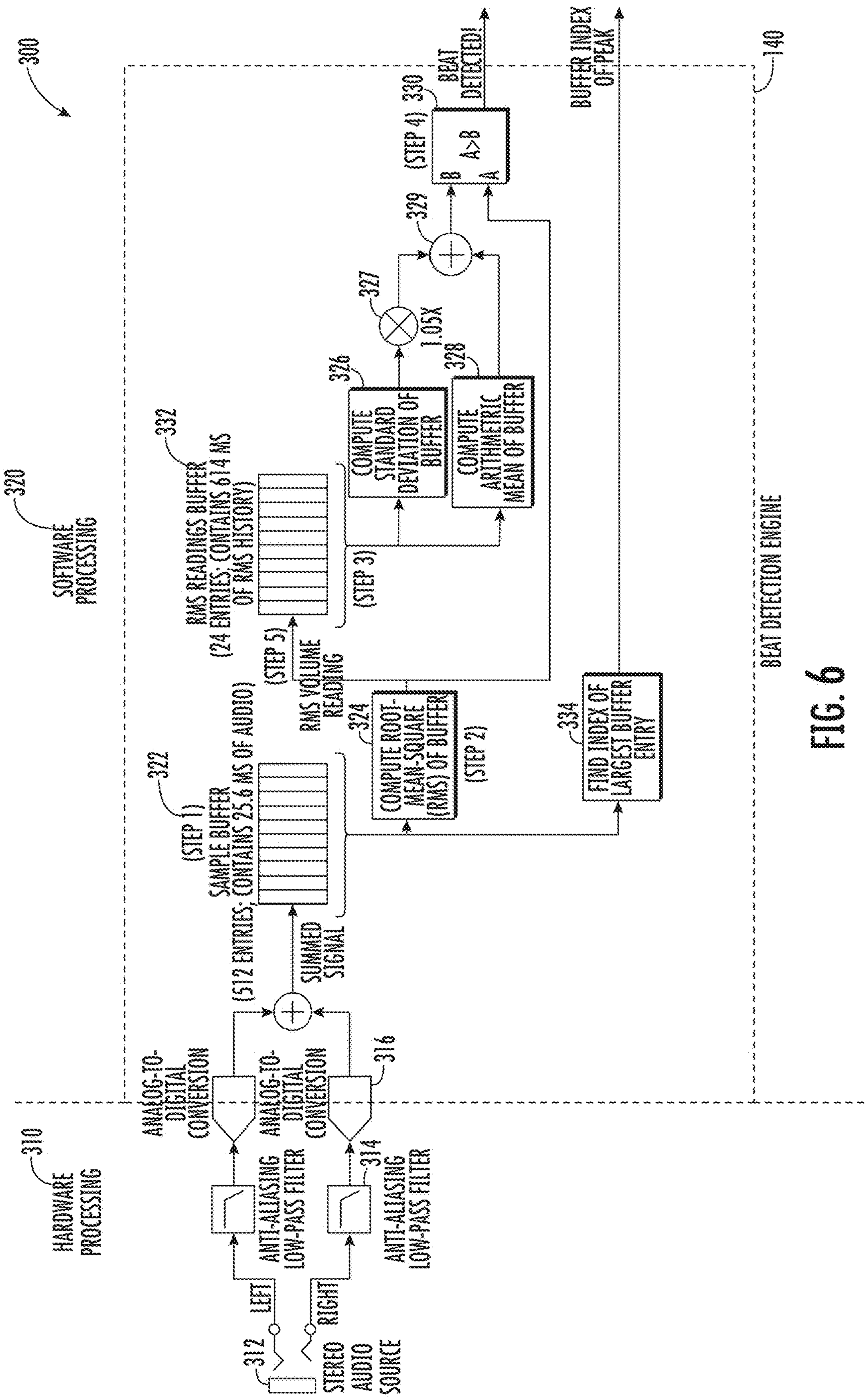
FIG. 6 is a schematic illustration of a beat detection engine and a process for detecting a beat according to some embodiments.

This process, according to some embodiments, is illustrated in the schematic illustration of the signal flow of the beat detection engine 140 shown in FIG. 6. A process 300 for detecting beats may include hardware processing 310 and software processing 320. The hardware process may begin with a signal from an audio source 312. The signal may be passed through one or more filters 314, such as anti-aliasing low-pass filters. In some embodiments, the signal may then experience and analog-to-digital conversion 316. As shown in FIG. 6, the signal may include a left stereo signal and a right stereo signal and each passes through a filter 314 and experiences an analog-to-digital conversion 316.

In some embodiments, the software processing 320 begins after the analog-to-digital conversion 316. The software processing 320 may occur within beat detection engine 140, as illustrated schematically in FIG. 6. As an initial step, the left and right stereo signals may be summed. At operation 332, a sample buffer is filled. For example, the sample buffer may include 25.6 milliseconds worth of audio samples. In some embodiments, 25.6 milliseconds of audio samples may include 512 entries. As another example, the sample buffer may include 12.8 milliseconds worth of audio samples. In some embodiments, 12.8 milliseconds of audio samples may include 256 entries, thereby reducing latency between the audio stream and the beat detection by half. Elapsed time may be tracked via a 32-bit counter, increasing its count by 1 at a rate of 1 MHz (once per microsecond). Each time the audio buffer's RMS measurement exceeds detection threshold, the current value of this 1 MHz counter is stored for reference, as is the buffer index (ranging between 0 [the first sample in the buffer] and 255 [the last sample in the buffer]) of the largest peak contained within this audio buffer.

To calculate the elapsed time between beats, the first step is to subtract the microsecond-count of the previously-detected beat from the presently detected beat's microsecond-count. Here is an example line of code: "float period_bw_bufs=abs (current_us-last_beat_us);//how many microseconds have elapsed between this moment (when the buffer's RMS has exceeded beat detection threshold) and the previous beat detection?". Since the peak of a beat may be located at any moment in time within the 12.8-millisecond buffer, using only this "period_bw_bufs" result to calculate beat periods will produce a worst-case error of 25.5 milliseconds. This worst-case inaccuracy is demonstrated if the previous peak occurred on the first sample of its buffer, while the latest peak occurred at the last sample of its buffer. This can be refined to a greater degree of accuracy if the exact location within the buffer of each detected beat's largest peak is accounted for. Here is an example line of code to find the exact location of the previously detected beat: "float last_beat_to_buf_end=(((float) (BUFFER_LENGTH_SAMPLES-1-lastMaxIdx))/BUFFER_LENGTH_SAMPLES)*BUFFER_LATENCY_US;//where BUFFER_LENGTH_SAMPLES is configured as 256 and BUFFER_LATENCY_US is 12800". And here is an example line of code to find the exact peak location for the latest beat detection: "float beat_to_buf_end=(((float) (BUFFER_LENGTH_SAMPLES-1-maxIdx))/BUFFER_LENGTH_SAMPLES)*BUFFER_LATENCY_US;//where BUFFER_LENGTH_SAMPLES is configured as 256 and BUFFER_LATENCY_US is 12800". Finally, these two peak locations are combined with the elapsed time between beat detection buffers to form a final result. Here is an example line of code: "uint32_t beat_period=(uint32_t) (last_beat_to_buf_end+period_bw_bufs-beat_to_buf_end);". This final result represents the elapsed time between two beats' peaks, with measurement error reduced from 25.5 milliseconds to 100 microseconds.

In some embodiments, at operation 334, the index of the largest buffer entry (e.g., the entry having peak loudness within the buffer) is found. This may be used to determine an exact timing of a detected beat (when a beat is detected using the other operations of process 300).

In some embodiments, at operation 324, the RMS 215 of the sample buffer is computed. This RMS 215 result serves as an approximation for how loud this 25.6 ms piece of audio sounds. A running history of the previous 24 RMS loudness measurements (representing the past 614 ms of music just played) serves as the baseline for comparison (see illustration associated with operation 332). In some embodiments, at operation 326, the standard deviation of the RMS values stored in the running history is computed. In some embodiments, at operation 327, the computed standard deviation from operation 326 is multiplied by 1.05. In some embodiments, other multipliers (besides 1.05) may be used. In some embodiments, at operation 328, the arithmetic mean of the RMS values stored in the running history is computed. In some embodiments, at operation 329, the results of operation 328 (i.e., the arithmetic mean of the RMS values stored in the running history) and operation 327 (i.e., a multiplier (e.g., 1.05) times the standard deviation of the RMS values stored in the running history) are summed.

In some embodiments, at operation 330, the results of operation 324 (i.e., the latest RMS 215 of the sample buffer) and operation 329 (i.e., 1.05 (or some other multiplier) standard deviations above the mean RMS of the RMS values stored in the running history) are compared with each other. In FIG. 6, the result of operation 324 is denoted as A and the result of operation 329 is denoted as B. If the latest RMS measurement is at least 1.05 standard deviations above the mean RMS value stored in the running history (or in other words, if A is greater than B), then a beat detection is triggered. In some embodiments, at operation 332, the latest RMS measurement is added to the running history, replacing the oldest measurement. The process then repeats with a new buffer of audio samples.

In some embodiments, the beat detection engine 140 triggers lighting actions on every sufficiently loud event (for example, using the process discussed above). In some embodiments, a user can control how frequently lighting actions occur (e.g., such that the beat detection engine 140 does not trigger lighting actions on every sufficiently loud event). For example, in some embodiments, a user can prevent beat detection for fixed periods of time (e.g. a lockout period). Thus, as shown, for example, in FIG. 7, the beat detection engine 140 may include activity periods 240 and lockout periods 250. In some embodiments, the activity periods 240 may begin with a trigger 230 (such as a detected beat). During the activity periods 240, the lights 110 are performing their beat-sensitive behavior, such as cycling through the colors of a multicolor pattern or changing brightness. During the lockout periods 250, the lights 110 may remain stationary (e.g., there are no changes to their brightness, color, etc.), and the music is unable to trigger any new behaviors. In some embodiments, the system 100 may offer the user a speed control in the form of selectable preset activity periods 240 and lockout periods 250. By changing the length of the activity periods 240 and lockout periods 250, the user can control how much lighting activity is triggered by a given piece of music.

Figure 7:
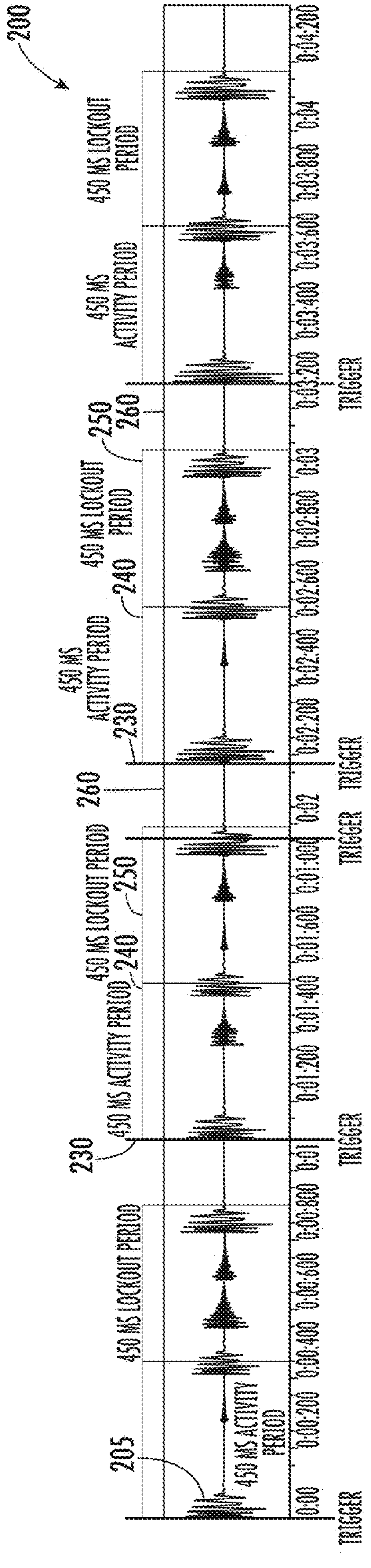
FIG. 7 is a schematic illustration of activity and lockout periods according to some embodiments.
Figure 8:
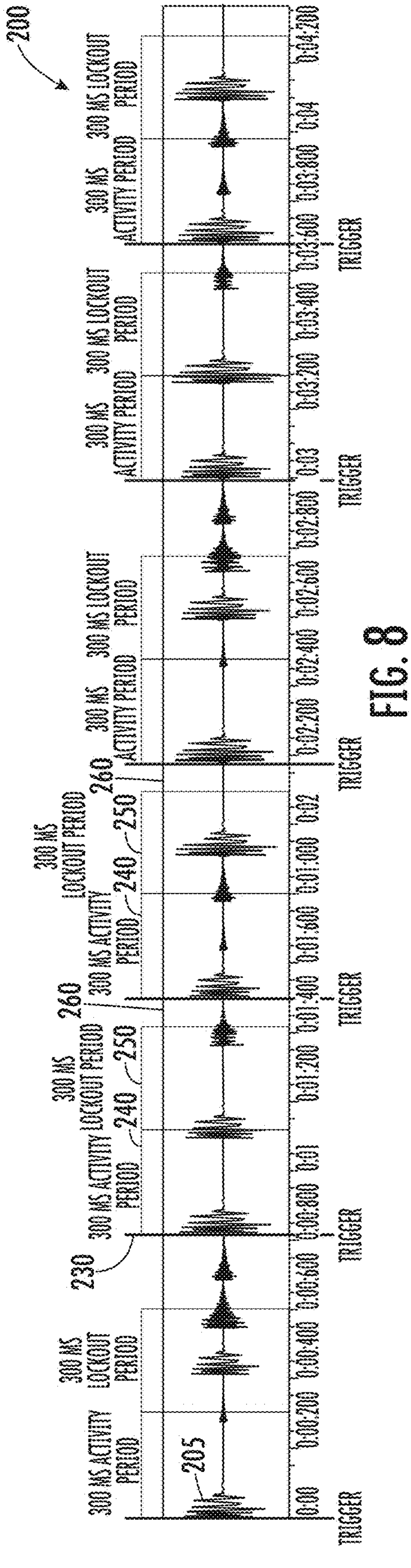
FIG. 8 is a schematic illustration of activity and lockout periods according to some embodiments.

Example activity periods 240 and lockout periods 250 are illustrated in FIGS. 7 and 8. As shown, the same audio clip 200 (having the same audio signal 205) produces different triggers 230 depending on the length of the activity periods 240 and lockout periods 250. There are also periods of time 260 during which the fixed activity periods 240 and lockout periods 250 have ended, but a new beat has not yet occurred so there is not yet a trigger 230 to trigger the next activity period 240.

In some embodiments, the tempo may be estimated, which may unlock even further improvements. For example, fixed activity periods 240 and lockout periods 250 produce unavoidable gaps in performance (e.g., periods of time 260), as shown in FIGS. 7 and 8. Specifically, the periods of time 260 are the gaps where the beat detector 240 is armed and waiting for a trigger event 230, but one has not yet occurred. With fixed activity periods 240 and lockout periods 250, the lighting activity will start on a beat, but it will likely not stop on one unless the fixed period happens to match the tempo of the song. Stopping lighting activity exactly on beat enhances the "musicality" of the lighting.

Figure 9:
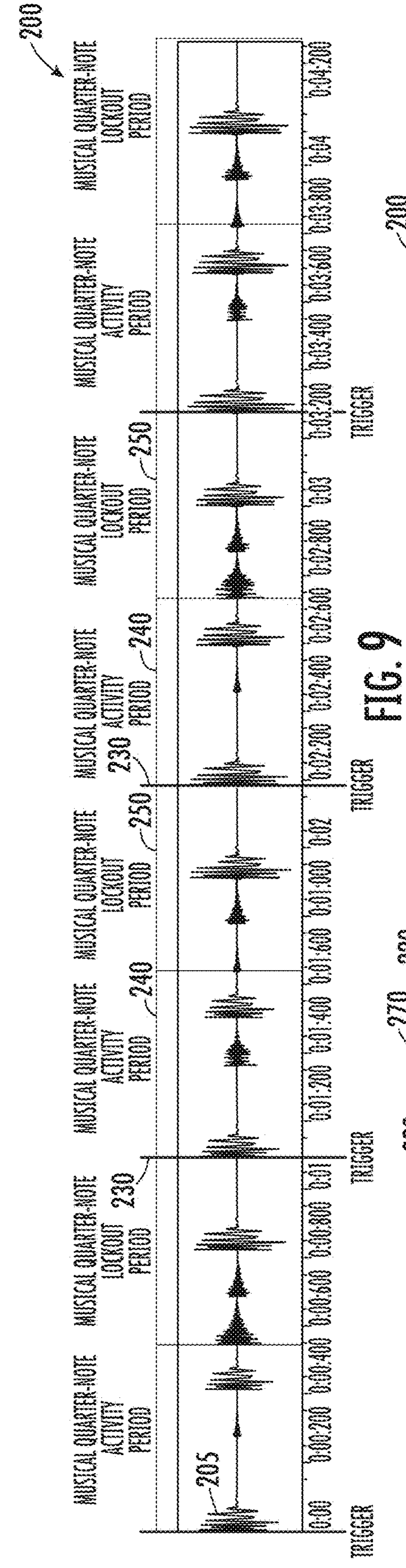
FIG. 9 is a schematic illustration of activity and lockout periods according to some embodiments.

Thus, if the beat detection engine 240 could set its activity periods 240 and lockout periods 250 to the underlying tempo of the music, a gapless performance could be achieved approaching that of a pre-programmed light show, as shown in FIG. 9. In FIG. 9, the length of the activity periods 240 and lockout periods 250 have been stretched to match the tempo of the song. Since the FIG. 9 activity period 240 spans exactly one quarter-note of the song, and since the lockout period 250 does the same, the lighting activity not only starts on a beat, it also stops on a beat.

Figure 10:
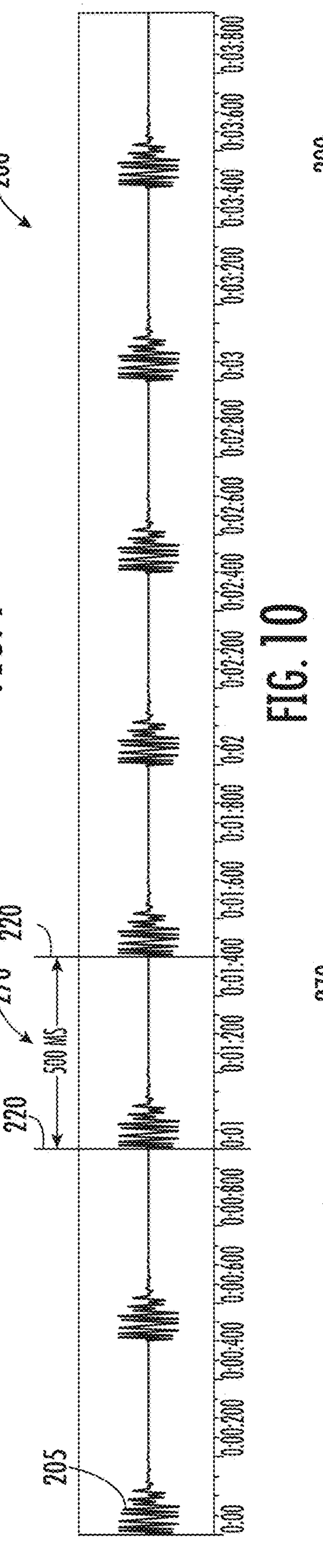
FIG. 10 is a schematic illustration of determining a tempo for a song with consistent rhythm according to some embodiments.
Figure 11:
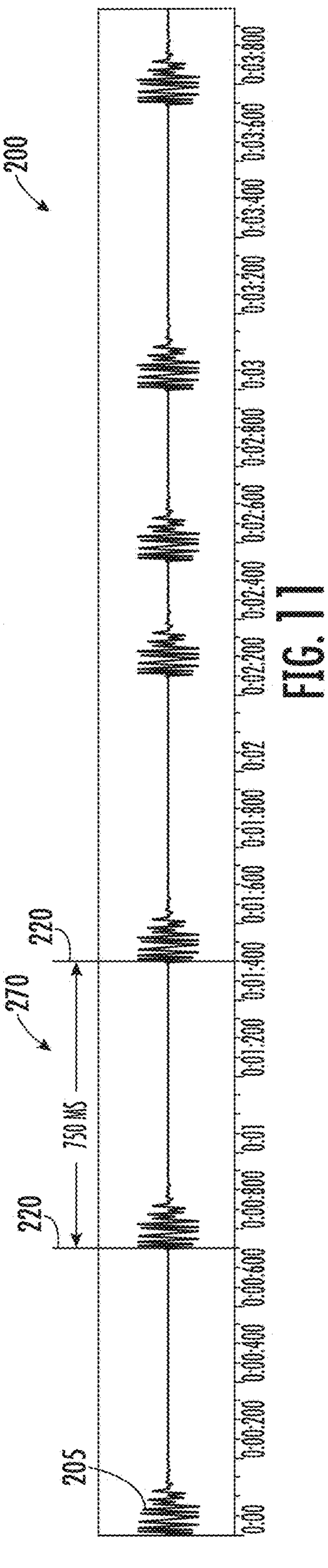
FIG. 11 is a schematic illustration of determining a tempo for a song with consistent rhythm according to some embodiments.

In some embodiments, for perfectly consistent rhythms such as the examples in FIGS. 10 and 11, estimating the tempo is as simple as measuring how much time 270 passes between beats 220. FIG. 10 illustrates the audio waveform 205 of a drum being struck 120 times per minute (120 BPM tempo). In this situation, 500 ms of time 270 ($1/120^{th}$ of a minute) elapses between each beat 220. FIG. 11 illustrates the audio waveform 205 of the same drum being struck 80 times per minute (80 BPM tempo). In this situation, 750 ms of time 270 ($1/80^{th}$ of a minute) elapses between each beat 220.

Figure 12:
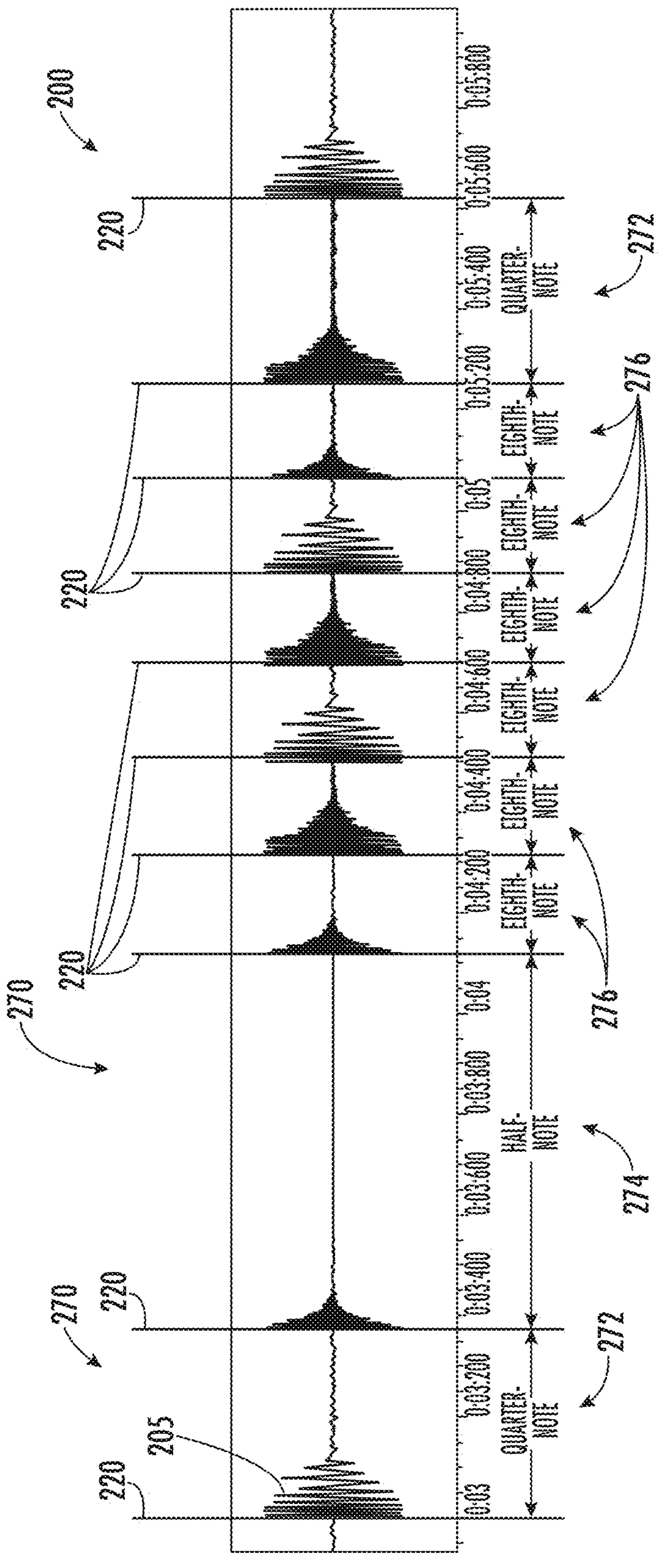
FIG. 12 shows a waveform of a drum pattern according to some embodiments.

In some embodiments, the lighting system 100 can also estimate the tempo for music having irregular beats 220. For example, the waveform in FIG. 12 shows a drum pattern being performed at a tempo of 80 beats per minute. The drum pattern includes different amounts of time 270 between beats 220, including a quarter note length of time 272, a half note length of time 274 and an eighth note length of time 276. Since the individual note durations vary, not only is the elapsed time 270 between beats 220 measured, but also a means of resolving these numerous measurements into a single tempo estimate is provided.

An example process for estimating tempo which provides for the ability to account for the irregular beats that often occur in real music is discussed below. In some embodiments, as shown, for example, in FIG. 13, a tempo estimation engine 150 stores an array 152 of beat scores 160 (e.g., a Beat Scoring Array 152). The Beat Scoring Array 152 may include a row for an array index 154, a row for tempo 156, a row for beat period 158 (i.e., elapsed time or duration), and a row for score 160.

Figure 13:
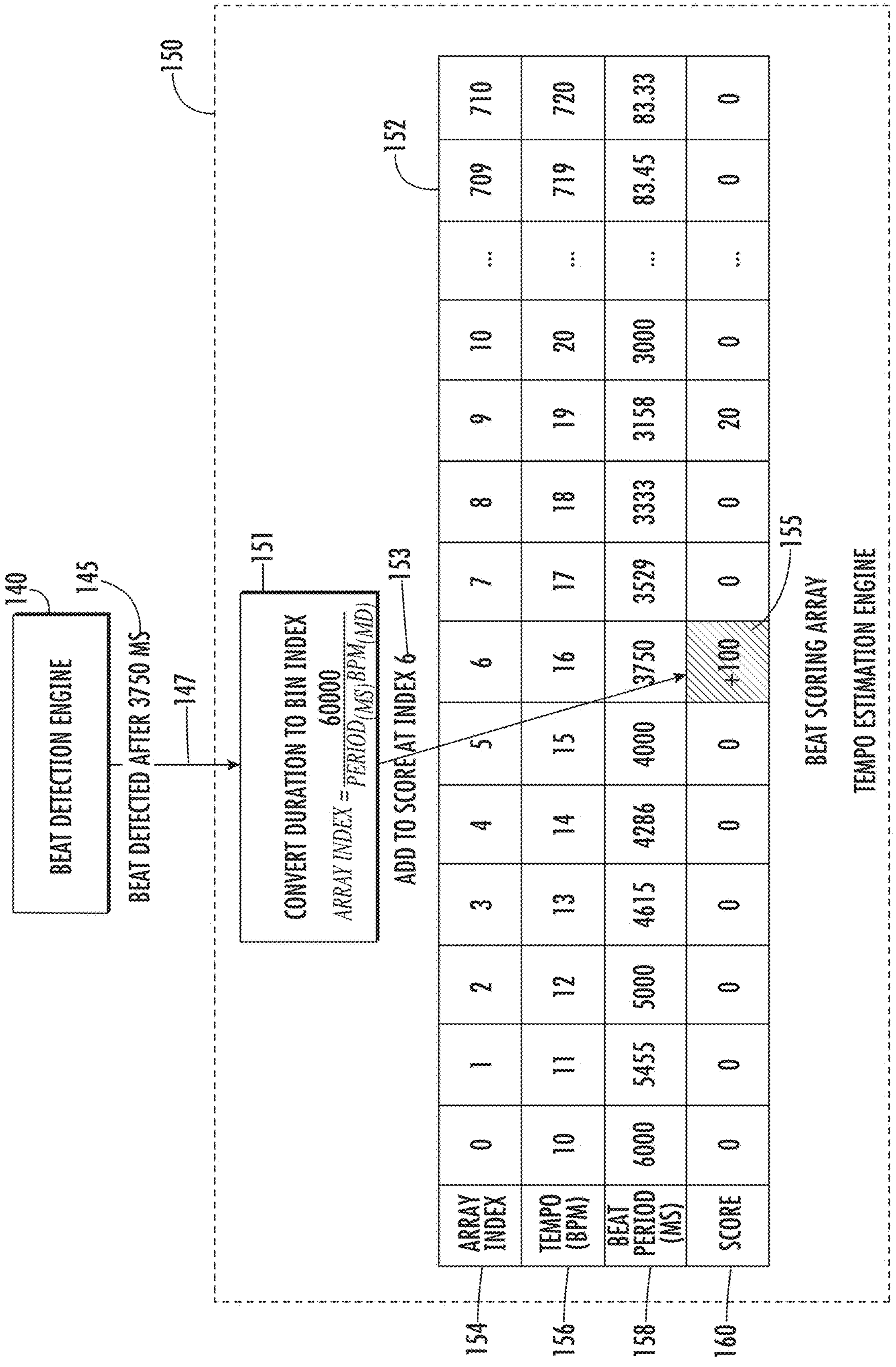
FIG. 13 shows a tempo estimation engine with a beat scoring array according to some embodiments.

An array 152 of beat scores 160 may be updated each time a new beat 220 is detected by beat detection engine 140. For example, at operation 145, beat 220 may be detected. The beat detection engine 240 may communicate that a beat 200 has been detected to tempo estimation engine 150 at operation 147. In some embodiments, a timer first measures, for example, as part of operation 145, how many milliseconds have elapsed between the previous beat 220 and the newly detected one. The elapsed time may also be communicated to tempo estimation engine 150 as part of operation 147. This elapsed time may be used to select which score 160 in the Beat Scoring Array 152 will be updated. In this way, the duration 158 of the new beat 220 (i.e., the elapsed time) is converted into a target array index 154. The beat score 160 stored at that array index 154 (i.e., the target score 160) is then increased by a fixed amount 155. For example, the fixed amount may be 100, as shown in FIG. 13. By this method, the Beat Scoring Array 152 will therefore contain higher scores 160 for the beat durations 158 that occur more frequently.

In FIG. 13, the first beat 220 is detected after 3,750 ms, which is associated with array index 154 of "6." In some embodiments, the target array index 154 is determined at operation 151, where the duration 158 is converted to an array index 154. In some embodiments, for example, with the example duration 158 of 3750 ms, the 3750 ms duration is plugged into the "Period (ms)" portion of the equation within the "Convert Duration to Bin Index" block of FIG. 13 at operation 151, and the "BPM minimum" value in the equation is the tempo stored at Array Index 158 of "0," which in this case is 10 BPM. The resulting array index 158 is "6." Thus, at operation 153, the score 160 for index 154 of "6" (which is a tempo 156 of 16 BPM and a beat period 158 of 3750 ms) is increased by a fixed amount 155. In the example show in FIG. 13, the fixed amount 155 is "100."

In some embodiments, the lighting system 100 and method runs continuously without user intervention. To allow for this, the tempo estimation algorithm may retain beat scores 160 long enough to make a reliable tempo estimate, but not so long that the retained scores 160 heavily outweigh incoming beats 220 whenever the music changes. In some embodiments, the scores 160 are running scores 160 which decay over time. The estimated tempo 156 may be based on the highest running score 160 over time, rather than simply the one with the most recent high score 160. If the music changes tempo, the previously estimated tempo's high score 160 will begin decaying until its score drops below that of the correct answer. Using this approach helps the estimated tempo 156 to remain relatively stable in the face of changing rhythmic patterns and thus reduces the chance of the lighting performance appearing chaotic if the estimated tempo 156 and associated lighting parameters frequently jump between values.

Figure 14:
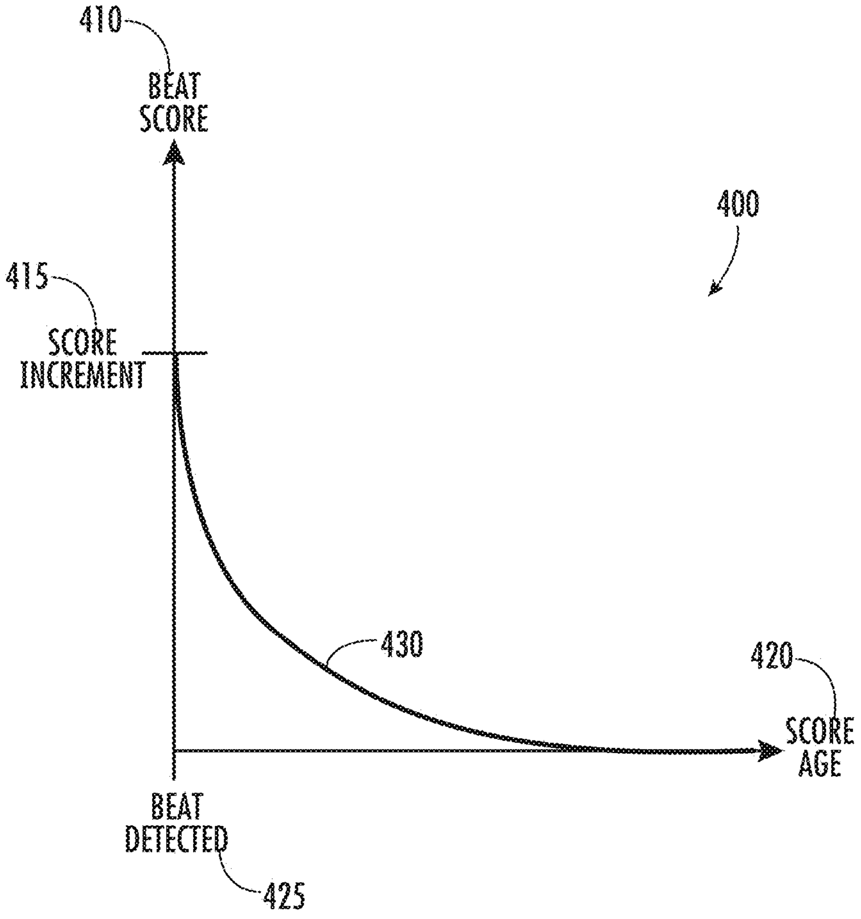
FIG. 14 shows a graph of a beat score decaying over time according to some embodiments.

For example, in some embodiments, each score 160 in the Beat Scoring Array 152 has an associated score age field. An example of a score 160 decaying over time is shown in graph 400 of FIG. 14. Graph 400 includes a beat score axis 410 (the y-axis) and a score age axis 420 (the x-axis). The score age for a particular tempo's score is "0" at time 425, when a beat is detected that results in a tempo estimate 158 equal to that particular tempo. The score increment at time 425 is represented by reference numeral 415. As shown in FIG. 14, a value of the score follows curve 430, exponentially decaying towards 0. In a similar manner, each score 160 exponentially decays toward 0 in proportion to its own age. When a newly detected beat 220 triggers an update of the Beat Scoring Array 152, the target score's age is reset to 0. All other non-target scores have their ages increased by the elapsed period between the previously recorded beat 220 and this newly detected beat 220.

Figure 15:
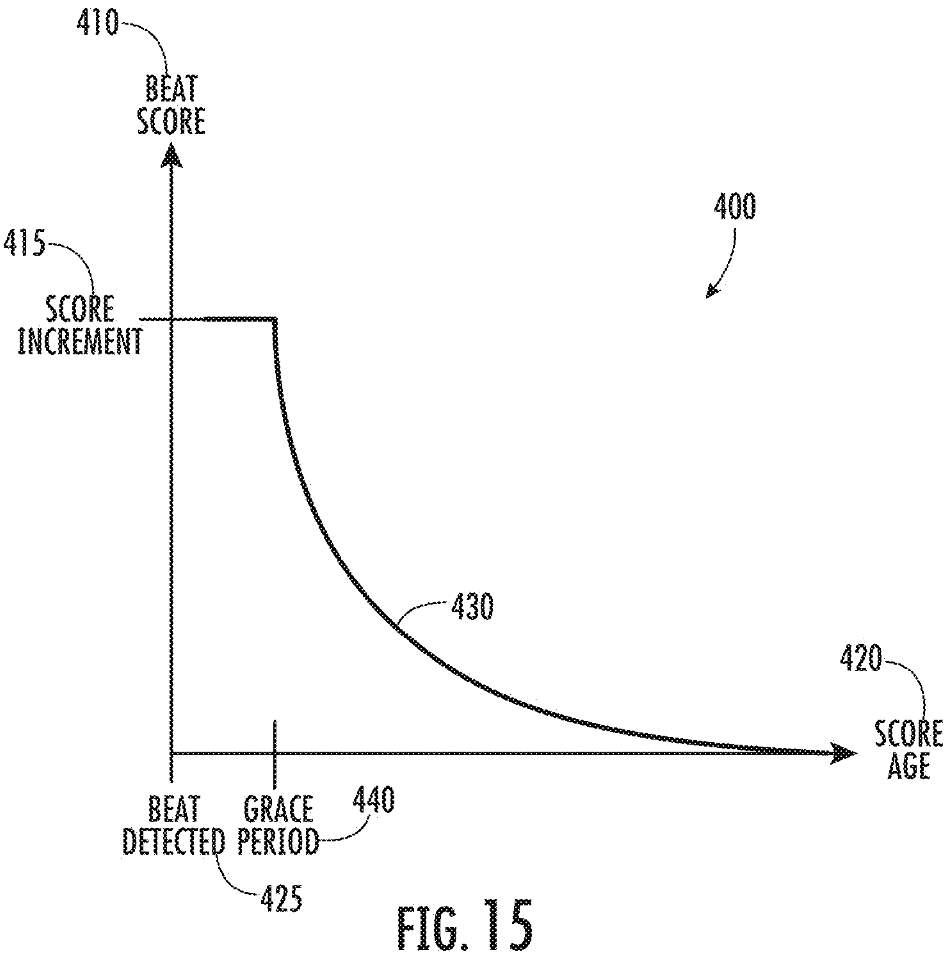
FIG. 15 shows a graph of a beat score decaying over time according to some embodiments.

The beat scores 160 associated with longer time periods 158 (and therefore slower tempos 156) cannot increase as frequently over a given span of time as the beat scores 160 associated with shorter time periods 158. Therefore, applying age-based decay equally to all scores 160 in the Beat Scoring Array 152 would unfairly favor the scores 160 associated with faster tempos 156, as the scores 160 associated with slower tempos 156 will have experienced significantly greater decay in between successive beats 220 than the higher-tempo scores 160. To account for this, in some embodiments, as shown, for example, in FIG. 15, a grace period 440 field is added to each score 160 in the Beat Scoring Array 152. During a score's grace period 440, no age-based decay will occur. All grace periods 440 may be directly proportional to the tempo 156 that a given score 160 represents. Scores 160 associated with slower tempos 156 may have longer grace periods 440 than scores 160 associated with faster tempos 156. In some embodiments, the grace periods 440 are set to 8*Beat Period (ms) 158 for each entry in the Beat Scoring Array 152. For example, the grace period 440 for 20 BPM, with a 3000 ms beat period 158, would be 24000 milliseconds (24 seconds). The grace period 440 for 720 BPM, with an 83.33 ms beat period 158, would be 666.64 ms.

The fastest tempos 156 represented within the Beat Scoring Array 152 are distinguished from one another by sub-millisecond differences in beat period 158. For example, the array score 160 associated with 719 BPM will grow if two detected beats 220 are separated in time by 83.45 ms. The 720 BPM array score 160 will grow if two beats 220 are separated by 83.33 ms. Imprecise timing—both in the musical source material and in the beat detection engine 140 itself—may lead to non-zero scores 160 being distributed across multiple nearby entries within the Beat Scoring Array 152. In some embodiments, this timing issue is alleviated by intentionally distributing scores each time a beat 220 is detected. For example, each time a score 160 is increased, its two adjacent neighboring scores may also be increased by a lesser amount. FIG. 16 shows, for example, a portion of a Beat Scoring Array 152, including the row for array index 154 and the row for score 160, as well as additional rows for portions of the score 160 associated with individual beats (e.g., a row for scores from the first beat 162, a row for scores from the second beat 164, and a row for scores from the third beat 166). The score 160 is the sum the scores from the first, second, and third beats 162, 164, 166. As shown, for example, in FIG. 16 if the array index 154 of "50" in Beat Scoring Array 152 is increased by 1000 (as in row for the first beat 162), the scores 160 at indices 154 of "49" and "51" are each increased by 500 (as shown in the row for the first beat 162). Assuming the incoming beats 220 are centered on index 154 of "50" while oscillating around it, index 154 of "50" will still have the highest overall score 160 among its neighbors, as illustrated in FIG. 16.

In some embodiments, the scores 160 in the Beat Scoring Array 152 may then be combined to form Tempo Candidates 172 (see FIG. 17). For example, a precomputed lookup table, such as table 170 shown in FIG. 17, may serve as a map to retrieve from the Beat Scoring Array 152 any scores 160 that correspond to notes (e.g., quarter note, eighth note, sixteenth note, half note, whole note, eight note triplet) within a candidate tempo 172. Specifically, table 170 includes a row for Tempo Candidates 172, a row for the array indices of quarter-note scores 174, a row for the array indices of eighth-note scores 176, a row for the array indices of sixteenth-note scores 178, a row for the array indices of half-note scores 180, a row for the array indices of whole-note scores 182, and a row for the array indices of eighth-note triplet scores 184. Thus, table 170 shows which array indices 154 have scores 160 that could be associated with a single tempo candidate 172. For example, the 45 BPM Tempo Candidate 172 will combine the scores 160 found at indices 154 of "35," "80," "170," "13," "2," and "125" of the Beat Scoring Array 152. In some embodiments, the resulting sum of these Beat Scoring Array 152 entries becomes a Tempo Candidate 172's estimate score.

In some embodiments, the scores 160 from the Beat Scoring Array 152 are multiplied by individual weighting factors before being summed together, and the resulting sum is a tempo candidate 172's final score. The final tempo estimate will then be selected by determining which Tempo Candidate 172 scores the highest. The weighting factors help ensure the best Tempo Candidate 172 is selected. For example, the 50 BPM Tempo Candidate 172 looks for its eighth-note score at index 154 of "90" of the Beat Scoring Array 152, and the 100 BPM Tempo Candidate 172 looks for its quarter-note score also at index 154 of "90" of the Beat Scoring Array (since it is twice as fast as the 50 BPM Tempo Candidate 172). If index 154 of "90" contains the only nonzero score in the Beat Scoring Array 152, it may be difficult to know whether the music's tempo is 50 BPM or 100 BPM. In some embodiments, to address this issue, each Tempo Candidate 172 multiplies its component Beat Scoring Array 152 scores 160 by weighting factors before summing them. The weighting factor for an eighth-note is higher than the weighting factor for a quarter-note, since it would be expected that eighth-notes may occur more frequently than quarter-notes (because they are half the duration of quarter notes). Whether this assumption actually holds true depends upon the song that is playing. In the cases where the assumption is incorrect, the tempo estimate may be either half or twice as fast as the actual tempo of the song. In some embodiments, the weighting factor for the eighth note may be 4, the weighting factor for a quarter note may be 3, and the weighting factor for other notes may be 1. Other weighting factors may be used in some embodiments.

In the above 50 BPM/100 BPM example, the 50 BPM candidate multiplies the score 160 of index 154 of "90" by the eighth-note weighting factor, while the 100 BPM candidate multiplies the score 160 of index 154 of "90" by the quarter-note weighting factor. Since the eighth-note weighting factor is higher, the 50 BPM Tempo Candidate will have a higher score than the 100 BPM candidate, so 50 BPM will be selected as the final tempo estimate.

In some embodiments, the lighting system 100 performs additional post-processing steps to provide more reliable tempo estimation. As noted above, variations in music lead to imperfect note periods, causing for example an 80 BPM song to also produce high scores at 79 BPM and 81 BPM. The running score that should belong to the 80 BPM Tempo Candidate will instead be split amongst itself and its two neighbors. Meanwhile, a distinctly different Tempo Candidate can be the wrong answer while still possessing a higher running score than any of the three right answers. To account for these variations, in some embodiments, if multiple consecutive Tempo Candidates have nonzero scores, their scores are summed and reallocated to the centermost Tempo Candidate.

In some embodiments, rather than allocating to the centermost Tempo Candidate, a binning operation may be done while allocating the adjacent scores to the Tempo Candidate with the highest score. For example, the aforementioned imperfect timing produces nonzero scores across many Tempo Candidates. Before selecting the highest-scoring Tempo Candidate as the final tempo estimate, the candidates' scores may be first consolidated using a binning operation. If a cluster of two or more adjacent Tempo Candidates have nonzero scores, those scores are summed together and given to the highest-scoring Tempo Candidate within the cluster. All other Tempo Candidate scores within the cluster may be reset to 0. An example of the binning operation is shown in FIGS. 18 and 19. In FIG. 18, chart 500 shows Tempo Candidates 510 before binning. Each Tempo Candidate 510 has a score 520. In chart 500, the score 520 that is shown is the score from previous steps divided by 100 (which reduces the number of digits for simplicity). As shown, some Tempo Candidates 510 (e.g., 62 BPM, 66 BPM, 67 BPM) have a score of 0. Other Tempo Candidates 510 have non-zero scores 520. Some of these Tempo Candidates 510 are adjacent Tempo Candidates 510 (e.g., 40 BPM and 41 BPM; 50 BPM, 51 BPM, 52 BPM, and 53 BPM, etc.).

FIG. 19 shows the Tempo Candidates 510 after binning. The adjacent Tempo Candidates 510 having non-zero scores 520 were consolidated (e.g., via addition) to a single Tempo Candidate 510 (e.g., the Tempo Candidate 510 with the highest score among the adjacent Tempo Candidates 510). For example, the scores 520 from Tempo Candidates 510 of 40 BPM and 41 BPM (see FIG. 18) were added and associated solely with Tempo Candidate 510 of 40 BPM (because the score 520 in Tempo Candidate 510 of 40 BPM from FIG. 18 is higher than the score 520 in Tempo Candidate 510 of 41 BPM). As another example, the scores 520 from Tempo Candidates 510 of 50 BPM through 53 BPM (see FIG. 18) were added and associated solely with Tempo Candidate 510 of 51 BPM (because the score 520 in Tempo Candidate 510 of 51 BPM from FIG. 18 is higher than the score 520 in the Tempo Candidates 510 of 50 BPM, 52 BPM, and 53 BPM). The other adjacent Tempo Candidates 510 are similarly consolidated (see FIGS. 18-19).

After this binning operation, the highest-scoring Tempo Candidate 510 is selected as the final tempo estimate. In FIG. 19, this would be the Tempo Candidate 510 of 156 BPM.

The tempo estimation approach described above determines how long a quarter-note (i.e., one beat) should last. From the duration of a quarter-note, the length of shorter and longer musical notes may easily be derived (e.g., by multiplying or dividing by 2), thereby enabling the lighting system's behaviors to be defined almost entirely in terms of musical notes. These behaviors may then scale with the tempo of the music as the music changes.

FIG. 20 shows an illustration of this principle. FIG. 20 shows a chart 600 of various example lighting parameters 610 and their values at different speed level 620 (e.g., speed levels 1-5). Speed level 620 may be user selected. Thus, a user may select one of speed levels 610 "1" through "5." In some embodiments, these speed levels 620 are not absolute speeds, but rather relative speeds based on the estimated tempo. Thus, even speed level 620 "1" is selected and maintained, the actual speed (i.e., the duration of different lighting parameters) will still vary if the tempo of the music varies.

The lighting parameters 610 may include, for example, duration 611 of a smooth color change, the length 612 of a beat detector lockout period 250, duration 613 of a dimmer increase, duration 614 of a dimmer decrease, the number 615 of pattern advances per beat trigger, and duration 616 of each pattern advance. Other lighting parameters may also be used. Each speed level 620 may define the actions based on note length. For example, at speed level 620 "1" the duration 611 of the smooth color change is equal to the length of a one-eighth note (of whatever tempo is estimated by the tempo estimation engine 150). At speed level 620 "2" the smooth color change speeds up and the duration 611 is shorter, equal to the length of a one-sixteenth note. Chart 600 shows additional examples in FIG. 20. The parameters in FIG. 20 are an example of how a single "lighting effect" is configured within the system. However, the system may have up to eight (8) or more different "lighting effects," each with their own table of parameters such as these. For example, see FIG. 21 for the parameter table for the "Waves" effect in the system.

As discussed above, starting and stopping lighting activities exactly "on beat" enhances the musicality of the lights. Defining every lighting parameter 610 in terms of note length (as done in FIG. 20) helps ensure that every action performed by the lights begins and ends in time with the music.

In some embodiments, the lighting system 100 and method disclosed herein allows for the tempo to be estimated in a short amount of time. For example, in some instances the tempo may be estimated in less than one second. In some embodiments, the system is configured to perform more basic lighting actions until the tempo has been estimated (e.g., a more basic flashing).

In some embodiments, the lighting system 100 and method uses statistics to achieve real-time moving-threshold beat-detection on audio sources. In some embodiments, the lighting system 100 and method maps beat durations to scoring bins and then sums those scoring bins to form tempo candidates. In some embodiments, the lighting system 100 and method detects musical beats, derives the tempo of a musical source, and then synchronizes the lighting behavior to the derived tempo. This is all done in real-time. In some embodiments, the lighting system 100 and method defines the lighting behavior in terms of musical note length.

Many additional implementations are possible. Further implementations are within the CLAIMS.

It will be understood that implementations of the lighting systems include but are not limited to the specific components disclosed herein, as virtually any components consistent with the intended operation of various lighting systems and methods may be utilized. Accordingly, for example, it should be understood that, while the drawings and accompanying text show and describe particular lighting systems and methods, any such implementation may comprise any shape, size, style, type, model, version, class, grade, measurement, concentration, material, weight, quantity, and/or the like consistent with the intended operation of lighting systems and methods.

The concepts disclosed herein are not limited to the specific lighting systems and methods shown herein. For example, it is specifically contemplated that the components included in particular lighting systems may be formed of any of many different types of materials or combinations that can readily be formed into shaped objects and that are consistent with the intended operation of the lighting systems and methods. For example, the components may be formed of: rubbers (synthetic and/or natural) and/or other like materials; glasses (such as fiberglass), carbon-fiber, aramid-fiber, any combination therefore, and/or other like materials; elastomers and/or other like materials; polymers such as thermoplastics (such as ABS, fluoropolymers, polyacetal, polyamide, polycarbonate, polyethylene, polysulfone, and/or the like, thermosets (such as epoxy, phenolic resin, polyimide, polyurethane, and/or the like), and/or other like materials; plastics and/or other like materials; composites and/or other like materials; metals, such as zinc, magnesium, titanium, copper, iron, steel, carbon steel, alloy steel, tool steel, stainless steel, spring steel, aluminum, and/or other like materials; and/or any combination of the foregoing.

Furthermore, lighting systems may be manufactured separately and then assembled together, or any or all of the components may be manufactured simultaneously and integrally joined with one another. Manufacture of these components separately or simultaneously, as understood by those of ordinary skill in the art, may involve 3-D printing, extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular lighting systems and methods implementations, it should be readily apparent that a number of modifications may be made without departing from the spirit thereof and that these implementations may be applied to other implementations disclosed or undisclosed. The presently disclosed lighting systems and methods are, therefore, to be considered in all respects as illustrative and not restrictive.

We claim:

1. A method for synchronizing lighting to music in real-time, the method comprising:

detecting beats in an audio stream of music;

estimating a tempo of the music in the audio stream based on the detected beats;

triggering one or more lighting actions in response to the detected beats based on the estimated tempo; and transitioning between activity periods during which lighting actions are triggered for the detected beats and lockout periods during which no lighting actions are triggered, wherein a length of the activity periods and lockout periods are defined based on the estimated tempo.

2. The method of claim 1, wherein detecting the beats in the audio stream of music comprises, for each of a plurality of audio samples within the audio stream:

determining a loudness of the audio sample;

comparing the loudness of the audio sample with an average loudness of a previous predetermined number of audio samples within the audio stream; and detecting a beat when the loudness of the audio sample is at least 1.05 standard deviation above the average loudness of the previous predetermined number of audio samples.

3. The method of claim 1, wherein estimating the tempo of the music comprises:

updating an array of beat scores each time a new beat is detected, the updating comprising measuring how much time has elapsed between a previous beat and the newly detected beat, identifying a target array index associated with the elapsed time, and increasing a score of the target array index by a fixed amount;

combining scores from the array of beat scores that correspond to each note length associated with each of a plurality of tempo candidates; and selecting a tempo candidate that has the highest combined score as the estimated tempo.

4. The method of claim 1, wherein the one or more lighting actions comprises an action selected from the group consisting of: changing a brightness of a light, changing a color of a light, turning a light on, and turning a light off.

5. The method of claim 1, wherein there is no more than 50 ms of latency between a detected beat and the one or more lighting actions triggered by the detected beat.

6. A method for synchronizing lighting to music in real-time, the method comprising:

detecting beats in an audio stream by, for each of a plurality of audio samples:

determining a loudness of the audio sample;

comparing the loudness of the audio sample with an average loudness of a previous predetermined number of audio samples; and detecting a beat when the loudness of the audio sample is at least 1.05 standard deviation above the average loudness of the previous predetermined number of audio samples; and triggering a lighting action in response to the detected beats.

7. The method of claim 6, further comprising transitioning between activity periods during which lighting actions are triggered for the detected beats and lockout periods during which no lighting actions are triggered.

8. The method of claim 7, wherein a length of the activity periods and lockout periods are defined based on a tempo of music in the audio stream.

9. The method of claim 8, further comprising estimating the tempo of the music in the audio stream by:

updating an array of beat scores each time a new beat is detected, the updating comprising measuring how much time has elapsed between a previous beat and the newly detected beat, identifying a target array index associated with the elapsed time, and increasing a score of the target array index by a fixed amount;

combining scores from the array of beat scores that correspond to each note length associated with each of a plurality of tempo candidates; and selecting a tempo candidate that has the highest combined score as the estimated tempo.

10. The method of claim 9, wherein the scores from the array of beat scores exponentially decay toward zero over time.

11. The method of claim 9, wherein the combined scores for adjacent tempo candidates are binned into one of the adjacent tempo candidates.

12. A system for synchronizing lighting to music in real-time, the system comprising:

a plurality of lights;

a controller configured to control operation of each of the plurality of lights, wherein the controller is configured to cause each of the plurality of lights to individually perform a lighting action;

a beat detection engine configured to detect beats in music being played; and a tempo estimation engine configured to estimate a tempo of the music being played, wherein the controller is configured to receive input from the beat detection engine and the tempo estimation engine and trigger one or more lighting actions in the plurality of lights in response to detected beats based on the estimated tempo, and wherein the controller is configured to transition between activity periods and lockout periods, a length of the activity periods and lockout periods defined based on the estimated tempo.

13. The system of claim 12, wherein the lighting action comprises an action selected from the group consisting of: changing a brightness of a light, changing a color of a light, turning a light on, and turning a light off.

14. The system of claim 12, wherein the controller is configured to trigger the one or more lighting actions during activity periods and is configured to not trigger the one or more lighting actions during lockout periods.

15. The system of claim 12, wherein the beat detection engine is configured to, for each of a plurality of audio samples within the music being played:

determine a loudness of the audio sample;

compare the loudness of the audio sample with an average loudness of a previous predetermined number of audio samples within the music being played; and detect a beat when the loudness of the audio sample is at least 1.05 standard deviation above the average loudness of the previous predetermined number of audio samples.

16. The system of claim 12, wherein the tempo estimate engine is configured to:

update an array of beat scores each time a new beat is detected by measuring how much time has elapsed between a previous beat and the newly detected beat, identifying a target array index associated with the elapsed time, and increasing a score of the target array index by a fixed amount;

combine scores from the array of beat scores that correspond to each note length associated with each of a plurality of tempo candidates; and select a tempo candidate that has the highest combined score as the estimated tempo.

* * * * *